Nov. 25, 1958  G. F. LANDEGREN  2,861,493
APPARATUS FOR MEASURING THE LIGHT ROTATORY POWER
OF AN OPTICALLY ACTIVE SUBSTANCE
Filed Jan. 29, 1953  5 Sheets-Sheet 1

*INVENTOR.*
GUSTALF F. LANDEGREN
BY Arthur H. Swenson

ATTORNEY.

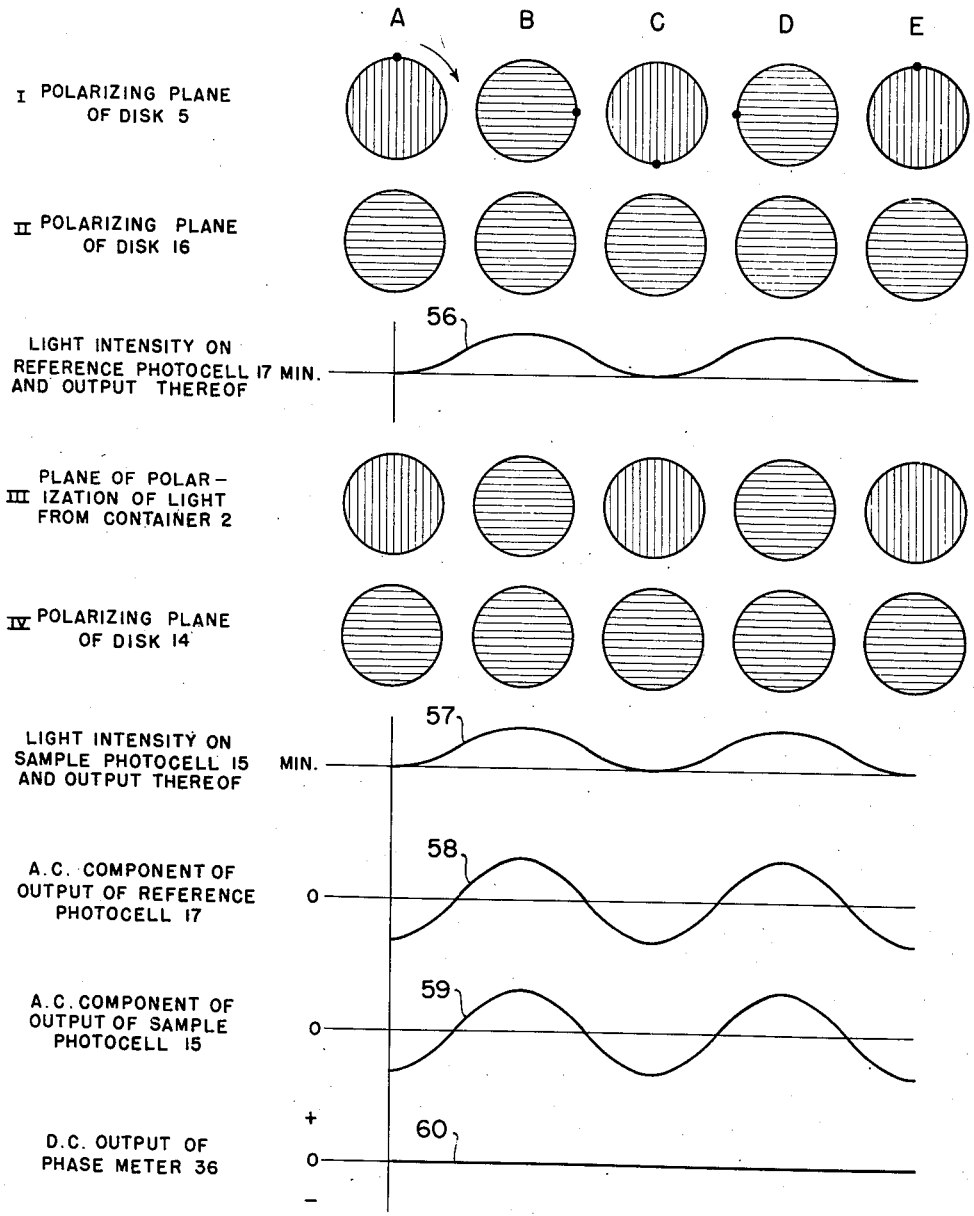

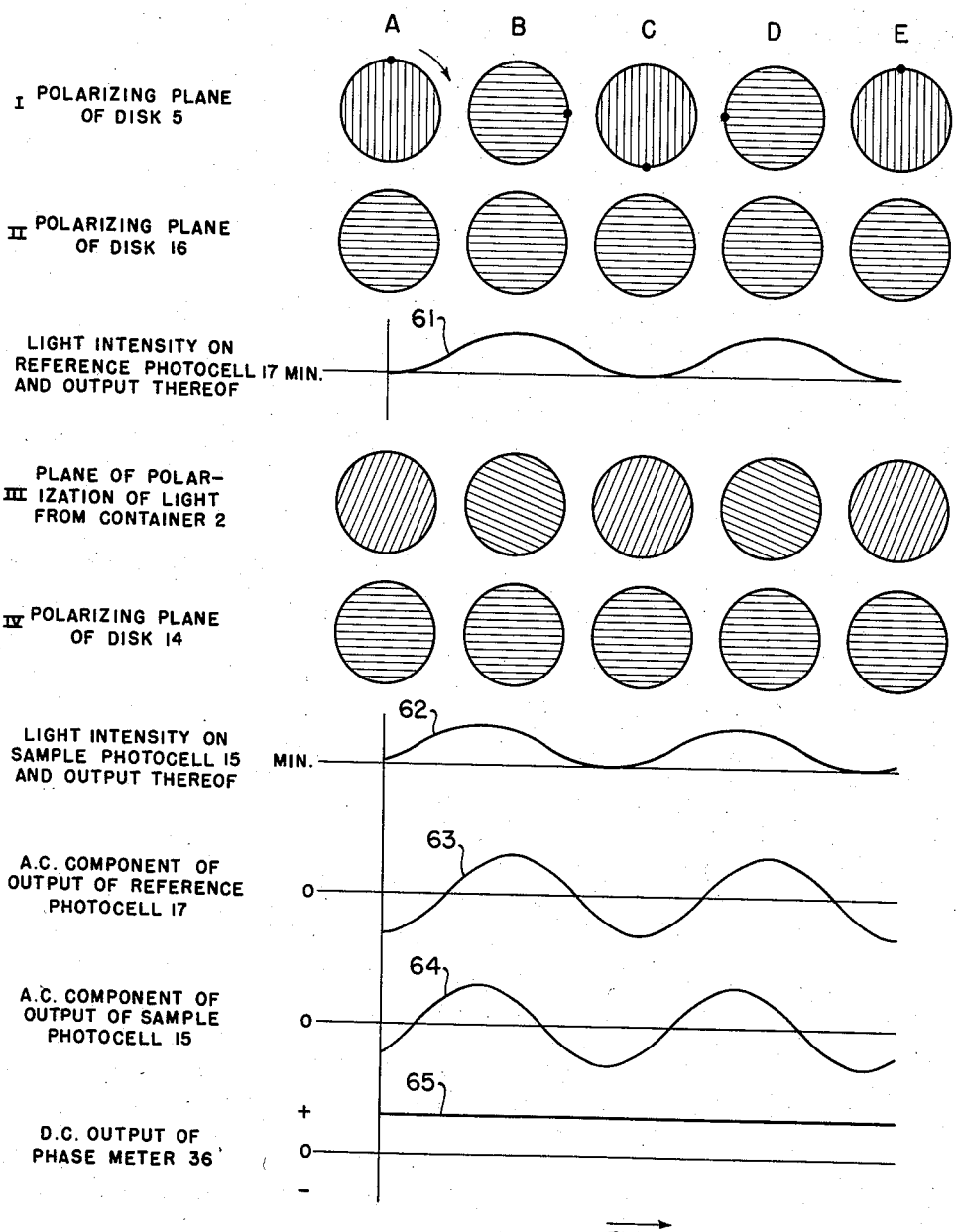

Nov. 25, 1958

G. F. LANDEGREN 2,861,493

APPARATUS FOR MEASURING THE LIGHT ROTATORY POWER
OF AN OPTICALLY ACTIVE SUBSTANCE

Filed Jan. 29, 1953

22½° COUNTER-CLOCKWISE
ROTATION BY SAMPLE

A   B   C   D   E

I POLARIZING PLANE
OF DISK 5

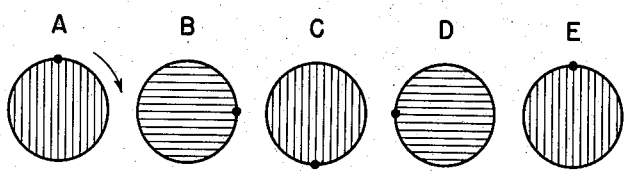

II POLARIZING PLANE
OF DISK 16

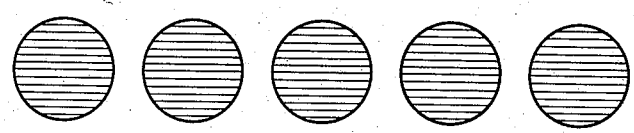

LIGHT INTENSITY ON
REFERENCE PHOTOCELL 17 MIN.
AND OUTPUT THEREOF

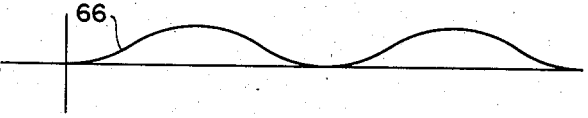

PLANE OF POLAR-
III IZATION OF LIGHT
FROM CONTAINER 2

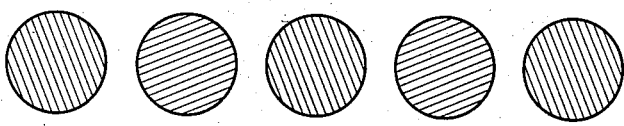

IV POLARIZING PLANE
OF DISK 14

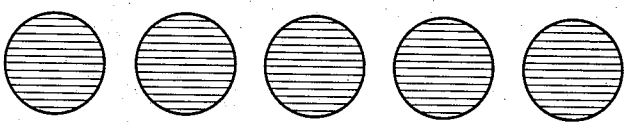

LIGHT INTENSITY ON
SAMPLE PHOTOCELL 15   MIN.
AND OUTPUT THEREOF

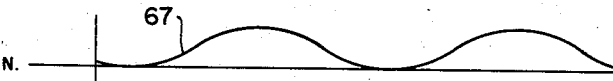

A.C. COMPONENT OF
OUTPUT OF REFERENCE    0
PHOTOCELL 17

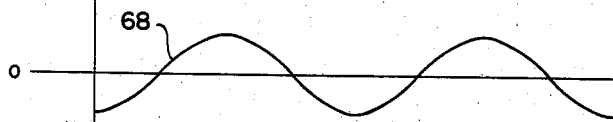

A.C. COMPONENT OF
OUTPUT OF SAMPLE    0
PHOTOCELL 15

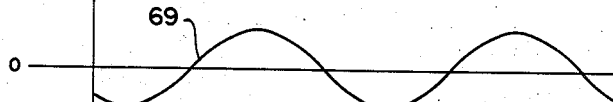

D.C. OUTPUT OF     +
PHASE METER 36     0
                   −

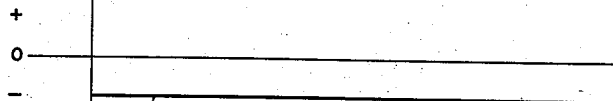

70
TIME

INVENTOR.
GUSTALF F. LANDGREN
BY
Arthur H. Swanson
ATTORNEY.

Nov. 25, 1958

G. F. LANDEGREN 2,861,493

APPARATUS FOR MEASURING THE LIGHT ROTATORY POWER
OF AN OPTICALLY ACTIVE SUBSTANCE

Filed Jan. 29, 1953

INVENTOR.
GUSTALF F. LANDEGREN

BY Arthur H. Swanson

ATTORNEY.

United States Patent Office 2,861,493
Patented Nov. 25, 1958

2,861,493

APPARATUS FOR MEASURING THE LIGHT ROTATORY POWER OF AN OPTICALLY ACTIVE SUBSTANCE

Gustaif F. Landegren, Beaumont, Tex., assignor to Minneapolis-Honeywell Regulator Company, Minneapolis, Minn., a corporation of Delaware Application January 29, 1953, Serial No. 333,911

12 Claims. (Cl. 88—14)

The present invention relates broadly to the determination or measurement of the light rotatory power of optically active substances, and relates specifically to novel apparatus for effecting such measurements without the use of the human eye as a comparison medium. More specifically, the invention relates to such novel apparatus wherein the light rotatory power of an optically active substance is measured through the medium of the phase angle between pulsating beams of plane polarized light falling on photoelectric devices.

The general object of the present invention is to provide novel apparatus for the measurement of the light rotatory power of optically active substances, which apparatus utilizes the phase angle between two pulsating beams of plane polarized light falling on photoelectric devices in effecting such measurements.

A more specific object of the invention is to provide such apparatus which is especially well adapted for the measurement of the light rotatory power of optically active solutions, and hence for the determination of the concentrations of such solutions, and which effects such measurements or determinations through the medium of the phase angle between pulsating light beams as distinguished from the relative intensities of such light beams.

Numerous optical devices and instruments are known in the art which are intended to be used manually for the determination or measurement of the light rotatory power of optically active substances. Such instruments, usually referred to as polariscopes because of their function in measuring the angle of rotation of polarized light, are quite often employed for measuring the light rotatory power of optically active solutions, since such measurements provide accurate measurements of the concentrations of such solutions. A highly important class of instruments of the type last mentioned is that of the saccharimeters, these instruments being polarimeters which are specially designed and arranged for the determination of the concentrations of sugar solutions.

The utilization or operation of instruments of the type just described is customarily carried out manually: that is, through the use of the eye of an observer as a comparing medium. For example, with the well-known polariscope of the half shadow type, the operator views a divided screen and manually adjusts an optical analyzer portion of the instrument until the halves of the screen are equally illuminated, at which time the adjusted portion provides an indication of the amount of rotation effected by the substance being analyzed. Such a procedure inherently requires the attention of a skilled operator, if satisfactorily accurate determinations are to be had, and even then is subject to well-known difficulties and disadvantages which arise due to the inherent defects of the characteristics of the human eye when utilized for such comparison purposes.

In an effort to overcome, or at least avoid, the difficulties and disadvantages stemming from the use of the human eye in making polarimetric measurements as just described, it has been suggested in the art to combine the so-called manually operated instruments with photoelectric devices so as to make it unnecessary to utilize the human eye for comparison purposes. For example, it has been proposed to combine a half shadow polarimeter with self-balancing photoelectric means to effect the automatic adjustment of the analyzing portion of the instrument until the two divided light beams, which are caused to fall on the photoelectric means, are of equal intensity.

The specific automatic instrument just described, as well as the results of the other attempts which have been made to provide an automatic form of polarimeter, have by no means solved the problem of producing a relatively simple, reliable, and accurate instrument for the determination or measurement of the light rotatory power of substances without the aid of the human eye as a comparing medium. All of such instruments of the prior art, with which I am familiar, are relatively complicated and costly, and require the inclusion of numerous optical elements and other delicate devices, thereby providing operation which is necessarily adversely influenced as to its reliability and consistency by the inherent sensitiveness and delicate nature of such a plurality of optical and similar devices.

Accordingly, it is the primary object of the present invention to provide novel apparatus for obtaining polarimetric measurements with a relatively simple, rugged, reliable, and inexpensive instrument which does not utilize the human eye for effecting comparisons of light beams or for similar functions, and which provides consistently accurate and reliable indications on a simply and easily readable scale means without the need for a plurality of sensitive, delicate optical elements or similar devices.

Another object of the invention is to provide apparatus for making such measurements wherein the amount or angle through which an optically active sample or substance rotates the plane of polarization of a plane polarized light beam determines the phase angle or phase difference between two pulsating electrical signals, whereby a measure of the light rotatory power of the sample is obtained by means sensitive to the phase angle between the two pulsating signals. Therefore, the desired measurements are made in accordance with the phase angle between pulsating light beams and pulsating electrical signals, as distinguished from being made in accordance with the differences in intensities of light beams or illuminated portions of screens, or the differences in the magnitudes of electrical signals.

A more specific object of the invention is to provide apparatus of the type just specified whereby the light rotatory power of an optically active substance in solution, and hence the concentration of the solution, are accurately measured automatically by the use of two pulsating plane polarized light beams falling on photoelectric devices which in turn actuate means responsive to any phase difference between the two pulsating light beams.

A still more specific object of the invention is to provide novel apparatus of the form just described wherein first and second beams of light polarized in a plane rotating at a selected rate are passed through separate, additional plane polarizing devices adapted to intercept the respective beams and to cause the latter to pulsate in intensity at a frequency related to the rate of rotation of the plane of polarization of the original beams. A sample of an optically active substance to be analyzed is adapted to intercept one of the beams prior to its passage through the corresponding plane polarizing device, whereby the pulsations of the two light beams are made to differ in phase from each other by an amount dependent upon the amount or angle through which the analyzed substance rotates the plane of polarization of the intercepted beam passing therethrough.

An even more specific object of the invention is to provide apparatus as just specified wherein a first portion of a beam of light polarized in a rotating plane passes through a first plane polarizing analyzer and falls on a first photoelectric device, wherein a second portion of said beam passes through a sample substance and a second plane polarizing analyzer and falls on a second photoelectric device, and wherein a phase meter is actuated by the outputs of the photoelectric devices and provides a measure of the phase difference between the pulsating outputs of the photoelectric devices and hence of the rotation of polarized light effected by the sample.

It is also a specific object of the invention to provide apparatus as just specified wherein the phase meter is utilized as a null detector in either a manually rebalanced or a self-balancing arrangement, and wherein, in the self-balancing form of apparatus, the phase meter is advantageously associated with apparatus operative to adjust one of said analyzers as long as there is any phase difference between the outputs of the photoelectric devices, whereby the adjusted position of the adjusted analyzer is made to be a function of the measured rotation effected by the sample, and hence of the sample concentration.

In accordance with the present invention, the preferred embodiments thereof illustrated and described in detail hereinafter by way of illustration comprise a plane polarizing device which is adapted to have a beam of monochromatic light passed therethrough, and which is operative to plane polarize the latter. The polarizing device is caused to rotate continuously by means of a suitably energized motor, whereby the plane of polarization of the light beam is caused to rotate also.

The light beam is then divided into two portions by suitable optical means, such as a half-silvered mirror, and one of these portions is passed through another, normally stationary plane polarizing device, whereby the light beam which emerges from the last mentioned polarizing device pulsates in intensity. This pulsating light beam falls upon a first photocell. The other portion of the light beam is first passed through a sample chamber, which is adapted to contain the substance or solution to be analyzed, and is then passed through another normally stationary plane polarizing device, whereby the light beam which emerges from the last mentioned polarizing device pulsates in intensity. This pulsating light beam falls upon a second photocell.

The two stationary polarizing devices are so relatively oriented that, when there is no optically active substance in the sample chamber, the two light beams falling on the respective photocells pulsate in intensity in unison or in phase with each other as the first mentioned polarizing device is rotated. This in turn causes the photocell output signals to pulsate in phase with each other.

When a solution of an optically active substance is placed in the sample chamber, the plane of polarization of the light beam passing through the chamber is rotated by the substance with respect to the plane of polarization of the other, unaffected light beam, whereby the pulsations of the light beams falling on the two photocells are caused to be relatively displaced in phase from one another. The amount of this phase displacement or difference, or, in other words, the magnitude of the phase angle between the pulsations of the two ligh beams, depends upon the extent of the polarization plane rotation effected by the sample substance, and hence is a direct measure of the concentration of the sample solution for the particular substance present under the existing conditions. Further, this phase angle will be either positive or negative, depending upon whether the pulsations of a given one of the two light beams lead or lag the pulsations of the other beam, and hence depending upon whether the sample has rotated the plane of polarization of the intercepted light beam in one direction or the other. As a result of this phase displacement between the pulsations of the two light beams, the same phase displacement occurs between the pulsations or undulations of the two photocell output signals.

The outputs of the two photocells are respectively connected to the two inputs of a suitable phase sensitive device, such as a phase meter, which is capable of providing a suitable indication of the magnitude and sign of any phase angle existing between the output signals of the photocells. Accordingly, the indication or reading provided by the phase meter is a direct measure of the extent and direction of polarization plane rotation effected by the sample substance being analyzed, and hence can be utilized as a direct measure of the concentration of the optically active substance in the sample solution.

Alternately, the indicating phase meter may be utilized as a null or balance detecting device instead of as a direct reading, deflectional instrument. When this is done, one of the normally stationary polarizing devices is advantageously made rotatable, and the latter is rotated to the proper position, either manually or automatically, as necessary to maintain a zero phase angle reading on the phase meter in the presence of a substance in the sample chamber. The concentration of the sample solution in the chamber is then indicated by a suitable scale and pointer arrangement which indicates the angular position of the last mentioned rotated polarizing device.

For either the deflectional or null-balance form of the apparatus as just described, the phase meter may be either an electric or an electronic phase responsive device. In the null-balance form of apparatus, an electronic type of phase meter may advantageously control the extent and direction of operation of an electric rebalancing motor which in turn is operative to position the rebalancing rotatable polarizing device. Suitable recording and/or controlling apparatus may be employed in conjunction with the phase meter of both the deflectional and null-balance forms of the apparatus wherever necessary or desirable.

The various features of novelty which characterize this invention are pointed out with particularity in the claims annexed to and forming a part of this specification. For a better understanding of the invention, however, its advantages, and the specific objects obtained with its use, reference should be had to the accompanying drawings and descriptive matter in which are illustrated and described preferred embodiments of the invention.

Of the drawings:

Figs. 2 through 4 are a series of diagrams and curves showing light intensity and electrical signal variations with time for different operating conditions of the apparatus of Fig. 1;

The embodiments of the present invention illustrate herein by way of example are operative to provide indications or measurements of the concentrations of solutions of optically active substances by measuring or determining the light rotatory powers possessed by such solutions. As is known in the art, various substances, such as the sugars, turpentine, Rochelle salt, and others, have the power to rotate the plane of polarization of plane polarized light passed through the substances or solutions thereof, and hence are referred to as optically active substances. Moreover, in the case of solutions of such optically active substances, hereinafter referred to as optically active solutions, the angle through which a given solution is operative to rotate the polarization plane bears a fixed relationship to the solution concentration for a given substance, length of light path through the solution or solution thickness, wavelength of light, and solution temperature.

Therefore, for a given optically active substance in solution, the concentration thereof can be measured in terms of the angular rotation effected by the solution on the plane of polarization of a beam of plane polarized light passed through the solution, providing that the thickness of the solution, the wavelength of the light, and the solution temperature are taken into account. Accordingly, if the last mentioned three conditions are maintained constant in value, it can be seen that the effected angle of rotation will vary directly in accordance with the solution concentration, and that the latter can be measured directly by measuring said angle. The making of such measurements in an improved and highly advantageous manner is the primary function of the various apparatus embodiments illustrated herein and now to be described.

Figure 1:
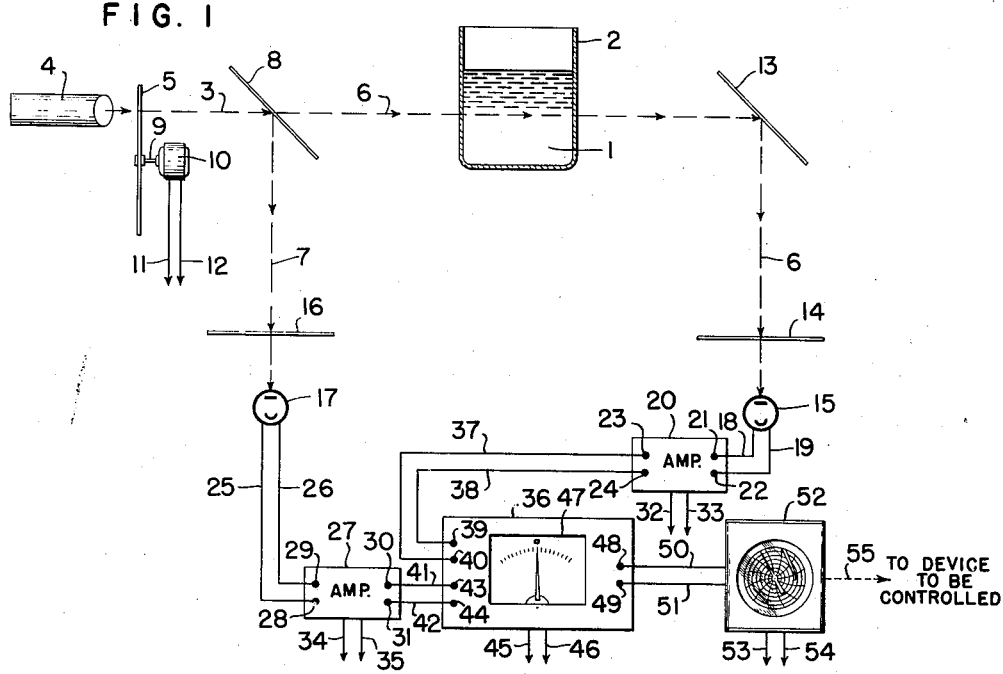
Fig. 1 is a diagrammatic representation of a deflectional form of the apparatus of the present invention utilizing an indicating phase meter to measure the concentration of an optically active solution.

*The Fig. 1 apparatus*

The form of apparatus according to the present invention which I have illustrated by way of example in Fig. 1 is a deflectional one, and is well adapted to provide a direct indication or measurement of the concentration of an optically active solution 1 contained in a transparent sample chamber or container 2. The Fig. 1 apparatus effects such measurements by measuring the phase difference between two pulsating beams of light, one of which is passed through the solution 1 and hence has its pulsations advanced or retarded in time, with respect to the pulsations of the beam not passed through the solution, by an amount dependent upon the magnitude of the optical activity or light rotatory power of the solution, and hence dependent upon the concentration of the solution.

To this end, each of the two pulsating light beams is caused to fall on a respective one of two photoelectric devices, and from each of the latter there is derived an A. C. signal having the frequency of the pulsations of the light beams, and alternating in synchronism with the pulsations of the corresponding beam. Accordingly, the phase angle between the two derived A. C. signals is respectively dependent in magnitude and sign upon the magnitude and direction of the rotary power of the sample solution, and hence upon the concentration of the latter. This phase angle or phase difference is measured by a phase angle measuring device to the inputs of which the two A. C. signals are applied, whereby the pase measuring device is operative to provide an indication which is dependent upon, and can be calibrated directly in terms of, the concentration of the sample solution.

In accordance with the foregoing, a parallel beam of light 3 from a light source 4, which may well be a source of monochromatic light as will be discussed hereinafter, is caused to pass through a first plane polarizing device 5, shown as a disk of a plane polarizing material, such as sold under the trademark Polaroid. The light beam is then divided into two portions 6 and 7 by a suitable optical device 8, such as a partially reflecting or half-silvered mirror. Alternatively, the device 8 may be a suitable prism. As shown, the disk 5 is mounted at its center on a shaft 9 which is adapted to be rotated by an electric motor 10. Hence, when the motor 10 is operatively energized by the connection of its energizing conductors 11 and 12 to a suitable source of electrical energy, the disk 5 is caused to rotate about its center at a speed which is dependent upon that of the motor 10. Advantageously, this speed is made to have a fairly constant value, as will be explained hereinafter. For some conditions of operation, it may be sufficient to provide means for rotating the disk 5 at a suitable speed by hand instead of by the motor 10.

The light beam 3 is caused to pass through the disk 5 in such a manner that the beam is plane polarized upon emerging from the disk, and in such a manner that the rotation of the disk causes the plane of polarization of the light beam to rotate about the beam axis. Therefore, the plane of polarization of the light beam 3 is made to rotate about the axis of the beam at a speed which is dependent upon that of the motor 10.

By virtue of the above described polarization of the light beam 3, each of the portions 6 and 7 thereof is plane polarized in a plane which rotates about the axis of the respective beam portion in synchronism with the rotation of the plane of the parent beam 3. The beam 6 is caused to pass through the solution 1 in the container 2, and has its rotating plane of polarization advanced or retarded a fixed amount by the solution, as will be described below. On emerging from the solution, the beam 6 is caused to call on a mirror 13, from which it is reflected and caused to pass through a second plane polarizing device 14, shown as a disk of a plane polarizing material, such as polarizing film. After passing through the disk 14, the beam 6 is caused to fall on a first photoelectric device or photocell 15. As will be more fully explained hereinafter, the intensity of the light of the beam 6 which reaches the photocell 15 pulsates at a frequency which is numerically equal to twice the speed of rotation of the plane of polarization of the beam 6.

The light beam portion 7 does not pass through the container 2, but is reflected frm the mirror 8 and caused to pass through a third plane polarizing device 16, shown as a disk of a plane polarizing material, such as polarizing film. After passing through the disk 16, the beam 7 is caused to fall on a second photoelectric device or photocell 17. The intensity of the light of the beam 7 which reaches the photocell 17 pulsates at the same frequency as does the light which reaches the photocell 15.

If desired, elements other than polarizing film, such as Rochon or Nicol prisms, may be employed as the plane polarizing devices 5, 14, and 16. Also, the rotating device 5 can be arranged, if desired, to polarize the seprarate light beams 6 and 7, after their separation by the device 8, instead of polarizing the original light beam 3 as is shown in Fig. 1. Also, the mirror 13 may be dispensed with, if desired, and the elements 14 and 15 placed in line with the light beam emerging from the container 2.

As a result of the pulsating nature of the light beam 6 which falls on the photocell 15, the output of the latter is a pulsating or undulating electrical signal which pulsates at the same frequency as does the light falling thereon. When the photocell 15 is of the photovoltaic type, as it will be assumed to be herein, its output will be a pulsating D. C. voltage which pulsates at the last mentioned frequency in synchronism with the pulsations in the light reaching the photocell.

The output voltage of the photocell 15 appears between the photocell output conductors 18 and 19, and is applied to the input of an A. C. amplifier 20 by virtue of the connection of the conductors 18 and 19 to the amplifier input terminals 21 and 22. The amplifier 20 is operative to amplify the A. C. component of the photocell output voltage, whereby the amplifier output appearing between the output terminals 23 and 24 is an A. C. signal having the frequency of the pulsating photocell D. C. output voltage, and alternating in synchronism with the pulsations of the light falling on the photocell 15.

Similarly, the photocell 17, also assumed herein to be of the photovoltaic type, has an output which is a pulsating D. C. voltage which pulsates at the aforementioned frequency and in synchronism with the pulsations in the light falling on that photocell. This output voltage, which appears between the photocell output conductors 25 and 26, is applied to the input of an A. C. amplifier 27 by virtue of the connection of the conductors 25 and 26 to the amplifier input terminals 28 and 29. The amplifier 27 amplifies the A. C. component of the photocell output voltage, and hence produces between the amplifier output terminals 30 and 31 an A. C. signal of said frequency which alternates in synchronism with the pulsations of the light falling on the photocell 17.

The amplifiers 20 and 27 may well be conventional A. C. voltage amplifiers, and are shown as being supplied with energizing voltage by means of respective energizing conductors 32 and 33, and 34 and 35. The latter are adapted to be connected to a suitable source of energizing voltage, not shown herein.

The output signals of the two amplifiers 20 and 27 are respectively applied to the two inputs of a phase angle measuring device or phase meter 36 which is operative to measure and indicate any phase difference between the two signals applied to its two inputs. Specifically, the output terminals 23 and 24 of the amplifier 20 are respectively connected by conductors 37 and 38 to the terminals 39 and 40 of the first of the two inputs of the phase meter 36, while the output terminals 30 and 31 of the amplifier 27 are respectively connected by conductors 41 and 42 to the terminals 43 and 44 of the second of the two phase meter inputs. The phase meter 36 also has energizing conductors 45 and 46 which are adapted to be connected to a suitable source of energizing voltage, not shown herein.

In addition to the components noted above, the phase meter 36 includes an indicating device 47 having a pointer which cooperates with a suitable scale to provide an indication of the magnitude and sign of the phase angle between the two voltages respectively applied to the two inputs of the phase meter. The latter also includes output terminals 48 and 49 between which the phase meter is operative to produce a D. C. output signal having a magnitude and polarity which are respectively dependent upon the magnitude and sign of the phase angle measured by the phase meter and indicated by the device 47.

The phase meter 36 may be of any of the several available types and forms which are suitable for the present purposes, and may well be, and will be assumed herein to be, of the specific type disclosed in Fig. 9 of the Shepherd Patent 2,370,692 of March 6, 1945. Since the construction and operation of such a phase measuring device are well known in the art, it is sufficient to note herein that the phase meter 36 is operative, as described above, to provide both an indication and an output signal representative of both the magnitude and sign of the phase angle, if any, existing between the two amplified A. C. photocell output signals applied to the two inputs of the phase meter. It is also noted that the operation of the phase meter in making such phase angle measurements is substantially independent of the frequency and relative magnitudes of the two input signals applied to the phase meter.

It may be found desirable, under certain conditions, to utilize as the phase meter 36 apparatus of a type which differs from that disclosed in Fig. 1. For example, in some instances, it may be sufficient to employ an electrodynamometer type of meter or a cathode ray oscilloscope as the phase meter 36. The particular device to be used under any specific conditions will naturally depend upon the nature of those conditions.

The output terminals 48 and 49 of the phase meter 36 are connected by respective conductors 50 and 51 to the input of a suitable indicating, recording, and controlling instrument 52, which may well be of the type disclosed and claimed in the Wills Patent No. 2,423,540 of July 8, 1947. The instrument 52 is provided with energizing conductors 53 and 54, which are adapted to be connected to a suitable source of energizing voltage, not shown herein, and is also provided with an output linkage 55 which may, if desired, be connected to a device which is to be automatically controlled in accordance with the phase angle measurements made by the phase meter 36. Additionally, the instrument 52 is operative to provide a continuous chart record of those phase angle measurements. If only an indication of the measured phase angle is desired, however, the instrument 52 may be dispensed with, and the phase meter 36 simplified by the elimination of the output terminals 48 and 49.

*Operation of the Fig. 1 apparatus*

The basic operation of the apparatus of Fig. 1 as just described will now be explained with reference to the diagrams and curves of Fig. 2. This figure pertains to the operation of the Fig. 1 apparatus when there is no optically active solution in the container 2, and clearly shows the optical and electrical relationships within the apparatus which enable the latter to produce the aforementioned two A. C. signals.

*The operation example of Fig. 2*

The top row I of diagrams of Fig. 2 shows various instantaneous positions A through E of the rotating disk 5 as the latter rotates through one complete revolution. The dot on the periphery of the disk is employed in Fig. 2 to illustrate the extent of disk rotation between the successive illustrated positions of the disk, and the arrow shows the direction of disk rotation. By noting the various instantaneous positions of this dot shown in Fig. 2, it is evident that the disk 5 advances through 90°, or one-fourth of a revolution, in the clockwise direction between successive ones of the illustrated positions A through E. Thus, for example, if it is assumed that the motor 10 rotates the disk 5 at a speed of thirty revolutions per second, or eighteen hundred revolutions per minute, the time for a total revolution of the disk 5 will be one-thirtieth of a second, and this time will be represented in Fig. 2 by the distance along the horizontal from position A to position E.

As is well known in the field of optics, a plane polarizing device, such as the disk 5, has the power to restrict the vibration of a beam of light to a predetermined plane, or group of parallel planes, which is perpendicular to the plane usually referred to as the plane of polarization. However, as a matter of convenience, the plane or parallel planes in which the vibration of the light is restricted in a beam of plane polarized light will be referred to herein as the plane of polarization or polarization plane of the light beam, or as the plane in which the light beam is polarized. Also, for convenience of description, the disk 5, as well as the other plane polarizing disks 14 and 16, will be hereinafter referred to as having a polarizing plane which is the plane in which the light emerging from the particular disk is polarized.

The parallel lines shown on the disk 5 in Fig. 2 are used therein to illustrate the manner in which the disk 5 plane polarizes light which is caused to pass through this disk, and to illustrate the manner in which the rotation of the disk 5 effects the rotation of the plane of polarization of light passing through the disk. Thus, these parallel lines may be thought of as representing the polarizing plane of the disk 5, or the plane of polarization in which light falling on the reverse side of the disk 5 will be polarized on passing through the disk and out of the plane of the drawing. Also, these parallel lines may be thought of as representing the parallel planes in which the vibration of a light beam is restricted after passing through the disk 5 and being plane polarized.

In accordance with the foregoing, the light which passes through the disk 5 when the latter instantaneously occupies position A may be said to be polarized in the vertical plane, while the light which passes through this disk when in position B may be said to be polarized in the horizontal plane. Therefore, it is apparent that the rotation of the disk 5 causes the light beam passing through the disk to be plane polarized in a plane which rotates about the axis of the beam through two complete polarization cycles for each complete revolution of the disk.

The row II diagrams in Fig. 2 show the position of the relatively stationary disk 16 with respect to the rotating disk 5 for the several instantaneous positions A through E of the latter. As in the case of the diagrams of the instantaneous positions of the disk 5, parallel lines are shown on the disk 16 to denote the polarizing plane of the disk, or the plane of polarization into which the disk 16 would polarize previously unpolarized light. Since the disk 16 is normally maintained stationary in the Fig. 1 apparatus, its polarizing plane is also maintained stationary, as indicated by the fixed orientation of the parallel lines in the several positions of the disk 16 shown in Fig. 2.

When previously plane polarized light falls upon the disk 16, there will emerge from the latter only that component of the incident light which lies in the polarizing plane of the disk 16. Therefore, the light which emerges from the disk 16 in the Fig. 1 apparatus rises and falls or pulsates in intensity in a sinusoidal manner as the disk 5 rotates the polarization plane of the light incident upon the disk 16.

The curve 56 of Fig. 2 illustrates the sinusoidal variations with respect to time in the intensity of the light beam 7 which is caused to fall on the photocell 17 after having passed through the rotating disk 5 and the relatively stationary disk 16. The variations illustrated by the curve 56 are those corresponding to the rotation of the disk 5 as the latter rotates and passes through the several illustrated instantaneous positions A through E. Thus, time as measured along the time axis of the curve 56, as well as along the time axes of the other curves of Fig. 2 to be hereinafter described, coincides with the continuous rotation of the disk 5 effected by the motor 10, it being assumed that the disk 5 rotates at a constant rate between the illustrated instantaneous positions A through E. Accordingly, the value of the variable indicated by the curve 56 at any given point along the time axis of the curve corresponds to the rotational position instantaneously occupied by the disk 5 at that time, either as shown by one of the illustrated positions A through E, or as would exist between two of the illustrated positions at a point directly above the particular time point on the time axis of the curve.

Since the magnitude of the D. C. output voltage of the photocell 17 can be assumed to be proportional to the intensity of the incident light, the curve 56 is also representative of the manner in which this output voltage varies with respect to time as the disk 5 is rotated through the positions A through E.

As illustrated in Fig. 2, the intensity of the light falling on the photocell 17 has a minimum value when the polarization plane of the light reaching the disk 16 is at right angles to the polarizing plane of the disk 16, since under this condition there is no component of the light incident upon the disk 16 which is parallel to the polarizing plane of that disk. This condition is seen to occur for instantaneous positions A, C, and E of the disk 5. Similarly, the last mentioned light intensity has its maximum value when the polarization plane of the light reaching the disk 16 is parallel to the polarizing plane of the latter, this condition occurring when the disk 5 has either of the instantaneous positions B and D. Further, said last mentioned intensity has successive intermediate values corresponding to successive intermediate rotational positions of the disk 5.

It is believed that the foregoing description, without further elaboration herein, serves clearly to explain the manner in which the rotation of the disk 5 produces the sinusoidally varying photocell output voltage illustrated by the curve 56. As can readily be seen from Fig. 2, this output voltage varies or pulsates at a frequency which is equal to twice the speed of rotation of the disk 5.

In the row III diagrams of Fig. 2, there are shown various instantaneous positions of the polarization plane of the light beam 6 as the latter emerges from the empty sample container 2. These diagrams are similar to those of rows I and II, and clearly illustrate the fact that, when there is no optically active solution in the container 2, the light emerging from this container is, at any instant, polarized in the same plane as that in which the light emerging from the disk 5 is polarized. In other words, when no optically active solution is present in the container 2, the plane of polarization of the light beam 6 suffers no additional rotation by virtue of passing through the container. Thus, the instantaneous polarization plane position illustrated by each of the diagrams in row III is seen to be parallel to the plane shown for the corresponding position of the disk 5 directly above in the top row of diagrams.

The row IV diagrams in Fig. 2 show the stationary position of the polarizing plane of the disk 14, just as the row II diagrams show the stationary position of the polarizing plane of the disk 16. The planes of the disks 14 and 16 are arranged to be parallel, as shown, and the light beam 6 falling on the photocell 15 after passage through the container 2 and the disk 14 therefore pulsates sinusoidally, as shown by the curve 57, in the same manner as does the light beam 7 falling on the photocell 17 as illustrated by the curve 56. Since the light beam 6 suffers no additional rotation by virtue of its passage through the container 2, and since the planes of the disks 14 and 16 are parallel, the light intensity shown by the curve 57 pulsates in synchronism and in phase with the light intensity shown by the curve 56.

As in the case of the curve 56, the curve 57 also represents the variations with respect to time in the magnitude of the D. C. output voltage of the corresponding photocell 15. Since the two light beams 6 and 7, respectively falling on the two photocells 15 and 17, pulsate in phase under the stated conditions as noted above, the two photocell output voltages of the respective curves 57 and 56 also pulsate or vary in phase, as shown. Therefore, when there is no optically active substance in the container 2, the two photocell output voltages are seen to rise and fall in synchronism and with zero phase angle between them.

The curves 58 and 59 of Fig. 2 respectively represent the A. C. components of the two pulsating D. C. voltages of the curves 56 and 57. More specifically, the curve 58 represents the A. C. output signal of the amplifier 27 associated with the photocell 17, while the curve 59 represents the A. C. output signal of the amplifier 20 associated with the photocell 15. Since the photocell 15 receives light from the source 4 which has been passed through the sample container 2, while the photocell 17 receives light directly from the source 4 without the intervention of the sample container, the photocell 15 may be referred to as the sample photocell, and the signal derived therefrom and represented by the curve 59 may be referred to as the sample signal. Similarly, the photocell 17 may be referred to as the reference photocell, and the signal derived therefrom and represented by the curve 58 may be referred to as the reference signal.

As would be expected from noting the relationship between the curves 56 and 57, the A. C. signals of the curves 58 and 59 are in phase with each other. In other words, there is zero phase angle between the A. C. signals derived from the reference photocell 17 and the sample photocell 15 when there is no optically active solution in the container 2, and hence when the plane of polarization in which the light beam 6 vibrates is not rotated additionally during its passage through the sample container.

When two A. C. signals which are in phase, as are the reference and sample signals of the curves 58 and 59, are applied to the two inputs of the phase meter 36 of Fig. 1, the latter is operative to provide an indication of zero on the indicator 47, and to produce no output between the terminals 48 and 49, as shown by the curve 60 of Fig. 2. Both of these actions correspond to an absence of an optically active solution from the sample container 2, and provide indications of such an absence.

The operation example of Fig. 3

In Fig. 3 there are shown various diagrams and curves which are similar to those of Fig. 2, but which pertain to the operation of the apparatus of Fig. 1 when an optically active solution 1 is present in the container 2. The top row I of diagrams of Fig. 3 is identical to the top row of diagrams of Fig. 2, and again illustrates various instantaneous rotative positions of the disk 5 and its polarizing plane as the disk rotates through one complete revolution. Also, the row II diagrams in Fig. 3 are identical to the row II diagrams of Fig. 2, since the polarizing plane of the disk 16 as represented in these diagrams is fixed in position. Further, the curve 61 of Fig. 3 is identical to the corresponding curve 56 of Fig. 2, since the intensity of the light falling on the photocell 17 and the output voltage of the latter, as reprsented by the curves 56 and 61, vary continuously in the same manner throughout all of the operating conditions of the apparatus.

With reference to the row III diagrams of Fig. 3, however, it is noted that the plane of polarization of the light beam 6 emerging from the container 2 as represented in each diagram is rotated a fixed amount in a clockwise direction with respect to the polarization plane of the light entering the container as shown in the diagram directly above in the top row. This effective advance in the rotation of the polarization plane is produced by the optically active solution 1, and is the fixed, angular displacement which is produced by the sample between the plane of the light leaving the container 2 and the plane of the light entering that container.

As was previously mentioned, this power of an optically active solution to rotate the polarization plane of plane polarized light passed through the solution is known as the light rotatory power of such a solution, and can be thought of as resulting in the application of a twisting or a spiraling motion to the polarization plane of the light which passes through the solution. The result is, as noted above, that the polarization plane of the light is twisted or rotated as the light advances through the solution, whereby the polarization plane of the light leaving the solution is angularly displaced with respect to the polarization plane of the light as it enters the solution. The size of this angle depends upon both the nature and concentration of the solution effecting the rotation, and upon the lineal distance which the light travels through the solution.

The difference between the direction of the parallel lines in each of the diagrams of row III of Fig. 3 and the direction of the parallel lines in the corresponding diagram directly above in row I, therefore, represents the fixed angle of rotation of the polarization plane effected by the solution 1 on the light beam 6 as the latter passes through the solution. This representation is, of course, on an instantaneous position basis, since the various diagrams merely illustrate the specific instantaneous positions A through E of the disk 5 and the rotating polarization plane of the light beams 6 and 7 as said disk and polarization plane rotate at the predetermined constant speed. Accordingly, the Fig. 3 diagrams of rows I and III actually illustrate the fact that the normal, constant rotation of the polarization plane of the light leaving the solution 1 is advanced, with respect to the normal, constant rotation of the polarization plane of the light which enters the solution, by an amount which is dependent upon the extent of the additional polarization plane rotation effected by the solution.

In the particular example chosen for illustrative purposes in Fig. 3, the polarization plane of the light beam 6 is seen to have been rotated or advanced by the solution 1 through an angle of substantially 22½° in the clockwise direction. Considered on the basis of the continuous rotation of the polarization plane of the light beam 6 effected by the disk 5, the rotational angle produced by the solution 1 represents an advance of 22½° between the rotating polarization planes of the entering and emerging light. In other words, the rotating plane of the emerging light can be said to lead the rotating plane of the entering light by said angle of 22½°.

The row IV diagrams of Fig. 3 again represent the fixed position of the polarizing plane of the disk 14, and are identical to the corresponding diagrams of row IV of Fig. 2. The curve 62 of light intensity reaching the sample photocell 15 differs, however, from the corresponding curve 57 of Fig. 2, due to the presence of the solution 1. A comparison between the curves 61 and 62 indicates that the intensity pulsations of the light on the sample photocell 15 are advanced in time or in phase with respect to the pulsations of the light on the reference photocell 17. Stated differently, the curves 61 and 62 show that the pulsations of the light on the photocell 15 lead those of the light on the photocell 17 in phase by a certain angle: namely, an angle of 45°. This phase displacement or phase angle is due to the above described rotation of the polarization plane of the light beam 6 by the solution 1, and to the fact that the light beam 7 does not pass through the solution 1 and hence is not affected thereby. This angle of 45° is double the 22½° angle through which the polarization plane is rotated by the solution 1 because of the aforementioned fact that the plane polarizing effect of the disk 5 and the pulsations of the light beams 6 and 7 falling on the photocells 15 and 17 pass through two complete cycles for every complete revolution of the disk 5 and the polarization plane of the beam 3.

The manner in which the occurrence of the light intensity pulsations of the curve 62 is advanced in time or phase with respect to the pulsations of the curve 61 is clearly seen from Fig. 3. Thus, for example, at the time corresponding to position B of the disk 5, the polarization plane of the light beam 7 is in alignment with the polarizing plane of the disk 16, whereby the light falling on the photocell 17 has a maximum value, as shown by the curve 61. By this same time, however, the polarization plane of the light beam 6 after passing through the solution 1 has rotated beyond the position of alignment with the polarizing plane of the disk 14, whereby the light falling on the photocell 15 has passed through its maximum intensity by this time and hence has a value somewhat below the maximum value, as shown by the curve 62. Stated differently, the light intensity of the curve 62 has its maximum value at a time just prior to the time represented by position B, at which time the light intensity of the curve 61 has its maximum value, since the polarization plane of the light beam 6 from the container 2 coincides with the polarizing plane of the disk 14 at a time just prior to that at which the polarization plane of the light beam 7 from the disk 5 coincides with the polarizing plane of the disk 16. Similarly, every other point on the curve 62 is advanced in time or occurs earlier with respect to the corresponding point on the curve 61, due to the advancement of the rotation of the polarization plane of the light beam 6 effected by the solution 1.

As in the case of the curves 56, 57, and 61, the curve 62 is representative of the D. C. output voltage of the corresponding photocell as well as of the intensity of the light falling thereon. Therefore, it is noted from the curves 61 and 62 that the pulsations in the output voltage of the photocell 15 lead those of the output voltage of the photocell 17 in phase by an angle of 45 electrical degrees.

The curves 63 and 64 of Fig. 3 represent the A. C. components of the output voltages of the photocells 17 and 15, respectively. As in the case of the curves 58 and 59 of Fig. 2, the A. C. voltages represented by the curves 63 and 64 are actually the output voltages of the respective amplifiers 27 and 20. Because of the noted phase displacement between the photocell output voltage pulsations shown by the curves 61 and 62, the A. C. output voltage derived from the sample photocell 15 and represented by the curve 64 is shown as leading by a phase angle of 45 electrical degrees the A. C. output voltage derived from the reference photocell 17 and represented by the curve 63.

When two A. C. signals which are 45° out of phase, as are the signals or voltages of the curves 63 and 64, are applied to the two inputs of the phase meter 36 of Fig. 1, the latter is operative to provide an indication of a 45° phase displacement on the indicator 47. The latter also indicates whether the sample signal from the sample photocell 15 is leading or lagging the reference signal from the reference photocell 17, and hence indicates whether the solution 1 has rotated the polarization plane of the light beam 6 in the clockwise or the counter-clockwise direction, as will be further discussed hereinafter. This indication of phase angle sign or sense is accomplished by the deflection of the pointer of the indicator 47 in the proper direction from the center scale indication of zero phase angle. Under the conditions of the present example, where the sample solution 1 produces a clockwise or positive rotation of the polarization plane, and the sample voltage is made to lead the reference voltage, it may be assumed that the apparatus connections are such that the pointer of the indicator 47 is deflected toward the right in Fig. 1.

In order to avoid any errors in phase angle indication which might be introduced if the frequency of the input signals to the phase meter 36 was permitted to vary indiscriminately during the making of measurements with the apparatus, it is desirable to maintain the speed of rotation of the disk 5 substantially constant, as noted hereinbefore. This, of course, maintains substantially constant the frequency of the phase meter input signals.

In addition to providing the indication just described, the phase meter 36 is also operative under the conditions now being discussed to provide a D. C. output signal between the terminals 48 and 49 of a magnitude and polarity representative of a 45° leading phase angle between the sample and reference input voltage applied to the phase meter. Such an output voltage is illustrated by the curve 65 of Fig. 3, the voltage magnitude represented by this curve being representative of a 45° phase angle, and the polarity of the voltage shown by the curve being representative of the sample voltage leading the reference voltage. This output voltage of the phase meter is utilized in the Fig. 1 apparatus to actuate the instrument 52 in the conventional manner.

It has been shown above that the apparatus of Fig. 1 is operative to provide an indication of the magnitude and sign of a phase angle which is produced between two A. C. signals as a result of the rotation of the polarization plane of a plane polarized light beam by the light rotatory power of an optically active solution. It has also been shown that the indicated phase angle has a magnitude which is equal to twice the angle through which the polarization plane rotation takes place, and has a sign which is dependent upon the direction in which the last mentioned rotation is effected. It should be readily apparent from the foregoing description that the relationships just stated hold true for all polarization plane rotation angles up to the limits of the range or scale of the phase meter 36, as well as for the particular angle of 22½° employed by way of example in connection with Fig. 3.

The manner in which the above described phase angle indications provided by the phase meter 36 can be utilized as direct measures of the concentrations of optically active solutions will now be discussed. As was previously noted herein, the angle through which a solution of an optically active substance rotates the plane of polarization of plane polarized light passing through the solution is dependent in magnitude upon the particular substance in solution, the concentration and temperature of the solution, the wavelength of the light employed, and the length of the light path through the solution, hereinafter called the thickness of the solution. From this it follows that the angle through which a given solution rotates such a polarization plane can be used as a measure of the solution concentration providing that the particular substance in solution, the solution temperature and thickness, and the light wavelength are known.

In order to permit the comparison of the optical activities of different substances so as to provide a means for determining solution concentrations on the basis of such activities, the term or unit of "specific rotation" has been adopted. By definition, the specific rotation of a substance in angular degrees is equal to the angle of polarization plane rotation effected by a solution of the substance divided by the concentration of the solution in grams of active substance per cubic centimeter (cc.) of solution, all for a given temperature of solution, a given wavelength of the light employed, and a given solution thickness. Therefore, for a given set of values for solution temperature, solution thickness, and light wavelength, every optically active substance in solution has a corresponding value of specific rotation which can be used in connection with different solutions of the substance under the same set of temperature, thickness, and wavelength values to permit the determination of the concentrations of such solutions from the angular polarization plane rotations effected thereby. Thus, each optically active substance has a given value of specific rotation for standard conditions of temperature, thickness, and wavelength, and this value of specific rotation is the factor which relates the concentration of any given solution of that substance, under the standard conditions, to the polarization plane angle rotation produced by the given solution under said conditions.

Specifically, the value of the concentration of a given optically active solution is obtained by dividing the value of the angle of polarization plane rotation effected by the solution under known temperature, thickness, and wavelength conditions by the value of the specific rotation for the particular substance in solution under the same conditions. Thus, if the specific rotation of a given substance is X degrees for a given solution temperature, a given wavelength of light, and a given solution thickness, and if a solution of that substance whose concentration is to be determined effects a polarization plane rotation angle of Y degrees under the same temperature, wavelength, and thickness conditions, the concentration of that solution will be equal to $Y/X$.

In applying the foregoing to the present invention, it is first noted that the magnitude of the angle indicated by the device 47 is always equal to twice the magnitude of the corresponding angle of polarization plane rotation effected by any given solution, as was previously brought out. Therefore, when utilizing a value of specific rotation for a given substance which pertains to that substance for the temperature, thickness, and wavelength conditions under which the polarization plane rotation angle is measured in terms of the double angle indication provided by the device 47, it is necessary to utilize a value of one-half of the angle indicated by the device 47 as the number into which the value of specific rotation is divided in order to obtain the value of the solution concentration.

In order to permit the indications provided by the device 47 to be thus used directly as measures of the concentrations of optically active solutions, it is apparent from the foregoing that the values of the solution temperature and thickness and the light wavelength must be taken into account. This is advantageously done by so arranging and operating the apparatus that these three conditions are held constant at predetermined, standard values for which corresponding published values of specific rotation for various substances are obtainable. When this is done, it is only necessary to select a value of specific rotation which corresponds to the particular substance in the solution to be analyzed and which applies for the values at which the three conditions are maintained constant.

This specific rotation value can then be utilized in combination with the indications provided by the device 47 to produce direct values of the concentration of solutions yielding those indications.

It is also contemplated that, if desired, the scale of the device 47 may be calibrated to indicate directly the concentrations of solutions of a particular substance. Moreover, a plurality of such scales can be provided on the device 47 each calibrated for a different substance. The successful use of such an arrangement requires, of course, that the temperature, thickness, and wavelength conditions be maintained constant at predetermined values corresponding to the values of specific rotation on which the various scales are based.

Alternately, it may be desired to provide the device 47 with direct reading concentration scales for the same substance but for different solution temperatures. These examples should serve to indicate that the apparatus of the present invention can be calibrated to provide its concentration measurements in whatever manner is found to be necessary or desirable under the prevailing conditions.

If desired, of course, the foregoing procedure of making measurements of polarization plane rotation angle while holding the aforementioned three conditions constant at standard values may be omitted, and the apparatus calibrated or its readings interpreted on the basis of solutions of known concentration placed in the container 2. However, the first described procedure is believe to be preferable, since it causes the desired results to be obtained under standard conditions, and hence permits such results to be readily compared with others made under the same standard conditions, in addition to permitting the use of standard, published values of specific rotation in arriving at the results.

The above should serve to explain why, as was stated earlier herein, it is desirable to utilize a monochromatic light source as the source 4. When this is done, the wavelength of the light of the beams 3, 6, and 7 is, of course, held constant at a predetermined value, thereby permitting consistent concentration measurements to be made over the entire range of the apparatus for any given substance by the use of the value of specific rotation which has been determined for that substance and for the wavelength of the particular monochromatic light employed. The importance of this procedure is readily apparent when it is noted that most optically active substances show marked changes in specific rotation with changes in the wavelength of the polarized light employed.

In regard to maintaining constant the other two of the three conditions discussed above, it is noted that any suitable one of the many known forms of automatic temperature control equipment may be employed to keep the solution 1 at the desired temperature while making the measurement of its concentration. Alternately, the solution temperature may be permitted to vary at will, but such a procedure necessitates the continual selection of the proper specific rotation value corresponding to the existing temperature.

As to the thickness of the solution, this condition is readily maintained constant by the use of a container 2 of fixed dimensions. Advantageously, these dimensions are such as to cause the solution thickness to have a value of ten centimeters (cm.), since this value is the accepted standard on which are based the majority of the published values of specific rotation for various substances. However, since the polarization plane rotation angle produced by a given solution is directly proportional in magnitude to the thickness of the solution, other conditions remaining constant, and since the apparatus of Fig. 1 produces indications which are numerically equal to twice the corresponding rotation angles, the angles indicated by the device 47 can be made to correspond to specific rotation values for a solution thickness of ten cm. by making the dimensions of the container 2 such that the solution thickness is actually but five cm. If this is done, it is then unnecessary to divide by two the indications provided by the device 47 when utilizing such indications in combination with specific rotation values based on a solution thickness of ten cm. to obtain direct measurements of solution concentrations.

It has been shown above, therefore, that the phase angle indications provided by the indicating device 47 of the phase meter 36 are directly proportional in magnitude to the magnitudes of the corresponding angles of polarization plane rotation effected by optically active solutions, in the container 2, and that those phase angle indications can be made to be directly proportional to the concentrations of such solutions. It was also mentioned hereinbefore that the sign or sense of the indicated phase angles is dependent upon the direction in which the polarization plane is rotated by the solution 1. The significance of such directional indications will now be discussed.

As is known in the art, certain of the optically active substances in solution always rotate the polarization plane of plane polarized light in the clockwise direction as viewed when looking toward the source of light, while the remainder of such substances always rotate said plane in the counter-clockwise direction as viewed in the same manner. Those substances producing such clockwise polarization plane rotation are said to produce right-hand rotation, and are known in the art as dextrorotatory substances. Solutions of sucrose are also dextrorotatory. The sample rotation illustrated in the example of Fig. 3 is, therefore, seen to be dextrorotatory, and, as noted above, causes the sample signal 64 to lead the reference signal 63 in phase, and causes the pointer of the indicating device 47 to be deflected toward the right in Fig. 1.

Conversely, those substances which produce counter-clockwise or left-hand rotation of the polarization plane are known in the art as levorotatory substances. The operation of the Fig. 1 apparatus in the presence of a levorotatory solution in the container 2 is shown by way of example by the curves and diagrams of Fig. 4, which will now be described.

The operation example of Fig. 4

The diagrams and curves of Fig. 4 are similar to the corresponding diagrams and curves of Fig. 3, but illustrate the operation of the Fig. 1 apparatus in the presence of a levorotatory sample solution 1 which effects a counter-clockwise rotation of the plane of polarization of the light beam 6 through an angle of substantially 22½%. Thus, the first two rows I and II of diagrams of Fig. 4 are identical to the corresponding first two rows of diagrams of Fig. 3, and the curve 66 of Fig. 4 is identical to the curve of 61 of Fig. 3, since the output of the reference photocell 17 remains unaffected by the solution 1. The row III diagrams of Fig. 4, however, show that the solution 1 causes the polarization plane of the light entering the container 2 to be rotated through an angle of 22½° in the counter-clockwise direction as the light passes through the container. This rotation is illustrated by the difference between the direction of the parallel lines in each of the diagrams of row III of Fig. 4 and the direction of the parallel lines in the diagram directly above in row I. Thus, the Fig. 4 diagrams of rows I and III illustrate the fact that the constant rotation of the polarization plane of the light beam 6 leaving the solution 1 lags the constant rotation of the polarization plane of the light which enters the solution by an angle of 22½°.

The row IV diagrams of Fig. 4 again represent the fixed position of the polarizing plane of the disk 14, and are identical to the corresponding diagrams of row IV in Figs. 2 and 3. The curve 67 of light intensity reaching the sample photocell 15, when compared with the curve 66 of light intensity reaching the reference photocell 17, illustrates that the polarization plane rotation effected by the solution 1 in the Fig. 4 example causes the pulsations of the light beam 6 reaching the sample photocell 15 to lag by 45° the pulsations of the light beam 7 reaching the reference photocell 17. The curves 66 and 67 also show that the sample photocell output lags the reference photocell output by 45 electrical degrees under this condition. The manner in which these phase displacements are produced by a solution which rotates the light polarization plane through an angle of 22½° in the counter-clockwise direction is believed to be apparent in view of the explanations made above in connection with the Fig. 3 example.

The curves 68 and 69 of Fig. 4 represent the A. C. components of the output voltages of the respective reference and sample photocells 17 and 15 for the conditions of the Fig. 4 example, and also represent the outputs of the respective amplifiers 27 and 20 under these conditions. As would be expected from a comparison of the curves 66 and 67, the A. C. voltage derived from the sample photocell 15 and shown by the curve 69 lags by a phase angle of 45 electrical degrees the A. C. voltage derived from the reference photocell 17 and shown by the curve 68.

When two A. C. signals which are 45° out of phase, and which have the phase sense of the voltages of the curves 68 and 69, are applied to the two inputs of the phase meter 36, the latter is operative to provide an indication which corresponds to the sample photocell voltage lagging the reference photocell voltage by an angle of 45°. Specifically, the pointer of the indicating device or indicator 47 is deflected to the left in Fig. 1, under these conditions, to the 45° position, thereby indicating both the magnitude and direction of the rotation effected by the solution 1. Thus, a left-hand deflection of the pointer of the device 47 indicates a negative or counter-clockwise polarization plane rotation, and shows that the solution 1 is levorotatory.

In addition to providing the indication just described, the phase meter 36 is also operative under the conditions of the Fig. 4 example to provide a D. C. output signal between the terminals 48 and 49 of a magnitude which is representative of a 45° phase angle between the sample and reference input voltages applied to the phase meter, and of a polarity which is representative of the sample voltage lagging the reference voltage. Such an output voltage is illustrated in Fig. 4 by the curve 70, which is seen to represent a D. C. voltage of the same magnitude as that produced by the clockwise rotation of the Fig. 3 example and shown by the curve 65, but of a polarity opposite to that shown by the curve 65. This output voltage of the phase meter 36 is therefore operative in the Fig. 1 apparatus to actuate the instrument 52 in the conventional manner.

To summarize the foregoing, it may be stated that a dextrorotatory solution in the container 2 is operative to produce a right-hand deflection from zero of the pointer of the indicator 47 to a position representative of a number of electrical degrees which is equal to twice the number of angular degrees through which the solution rotates the polarization plane of the light beam 6, and that a levorotatory solution is operative to produce a corresponding pointer deflection in the other or left-hand direction from zero. Therefore, the indication provided by the phase meter 36, and the indication and record produced by the instrument 52, are each representative directly of both the magnitude and direction of polarization plane rotation effected by any optically active solution placed in the container 2.

It is to be understood that the present invention is not limited in its usefulness to the determination of the light rotatory power of liquids, but that it is equally applicable to the determination of the light rotatory power of materials in other states. It is noted also that, if desired, the disk 5 may be maintained stationary, and the light beams falling on the photocells caused to pulsate by causing the disks 14 and 16 to be continuously rotated in unison. In each case, the operation obtained will be identical to that described above.

The effect on the phase meter 36 of any phase shifts which may be introduced by the amplifiers 20 and 27 can be eliminated in several ways. This can be accomplished, for example, by so relatively orienting the polarizing planes of the disks 14 and 16 that the two phase meter input signals are caused to be in phase with each other when no optically active solution is present in the container 2, thereby compensating for the phase shifts produced by the amplifiers. Alternately, this condition can be achieved by introducing additional, suitable electrical phase shifts into one or both of the signal channels between the photocells and the phase meter inputs.

If desired, the sensitivity of the apparatus just described can be increased by the insertion of a frequency multiplying device into each of the electrical channels between the corresponding photocell and phase meter input. If this is done, the phase shift indication provided by the meter 47 will be equal to the angle of rotation effected by the sample multiplied by twice the multiplication factor of the two frequency multiplying devices. The latter would necessarily have to be designed or otherwise caused to have the same multiplication factor. In this manner, the sensitivity of the described arrangement can be multiplied by any desired integral factor, subject, of course, to the limitations of the component devices.

Although not specifically illustrated in Fig. 1, the control effected by the instrument 52 through the linkage 55 might well be the control of the concentration of a solution which would be caused to pass continually through the container 2 or a modification thereof adapted for analysis of a sample continuously flowing therethrough. Other types of control, not described nor illustrated herein, can, of course, be effected by the apparatus of Fig. 1 if desired.

*A typical example of the Fig. 1 apparatus*

By way of illustration and example, and not by way of limitation, it is noted that a working model of apparatus according to the present invention and of the type illustrated in Fig. 1 embodies components and conditions as set forth below.

| | |
|---|---|
| Length of light path through container 2 | 10 cm. |
| Material of disk 5 | Polarizing film. |
| Diameter of disk 5 | 6 in. |
| Speed of rotation of disk 5 | 1800 R. P. M. |
| Material of disks 14 and 16 | Polarizing film. |
| Photocells 15 and 17 | Weston Photronic Cells. |
| Pulsating output of photocells 15 and 17 | 0.01 volt. |

*An operating example for the Fig. 1 apparatus*

As an actual operating example, let it be assumed for purposes of illustration that apparatus of the type just specified provides an indication of an electrical phase angle of +33° on the indicator 47 in the presence of a given sucrose solution in the container 2 for a solution temperature of 20° C. and a wavelength of the light from the source 4 of 5893 angstroms (the D-line of sodium). Let it also be assumed that it is desired to determine the concentration of said sucrose solution in grams of sucrose per 100 milliliters (ml.) of solution on the basis of the indicated 33° phase angle provided by the Fig. 1 apparatus. Such a determination can readily be made in the following manner.

The specific rotation (r) for sucrose under the above stated values of temperature and wavelengths, which values are almost universally standard in the art, is given in published data as +66.3 angular degrees per decimeter (10 cm.) of solution thickness. Since the actual angle (θ) through which the solution 1 of the present example has rotated the polarization plane of the light beam 6 is one-half of 33 electrical degrees or 16½ angular degrees, and since the solution thickness is 10 cm., as specified above, the concentration (C) of the solution 1 based on the foregoing definition of specific rotation, will be:

$$C = \frac{\theta}{r}$$

$$= \frac{16.5}{66.3}$$

$$= 0.249 \text{ gm. of sucrose per cc. of solution}$$

Changing this value of the concentration C into the required form stated above gives:

$$\frac{0.249 \text{ gm.}}{\text{cc.}} \times \frac{100 \text{ cc.}}{100 \text{ ml.}} = 24.9 \text{ gm./100 ml.}$$

Therefore, the sample solution of this example would have a concentration of 24.9 grams of sucrose per 100 milliliters of solution under the stated conditions.

Figure 5:
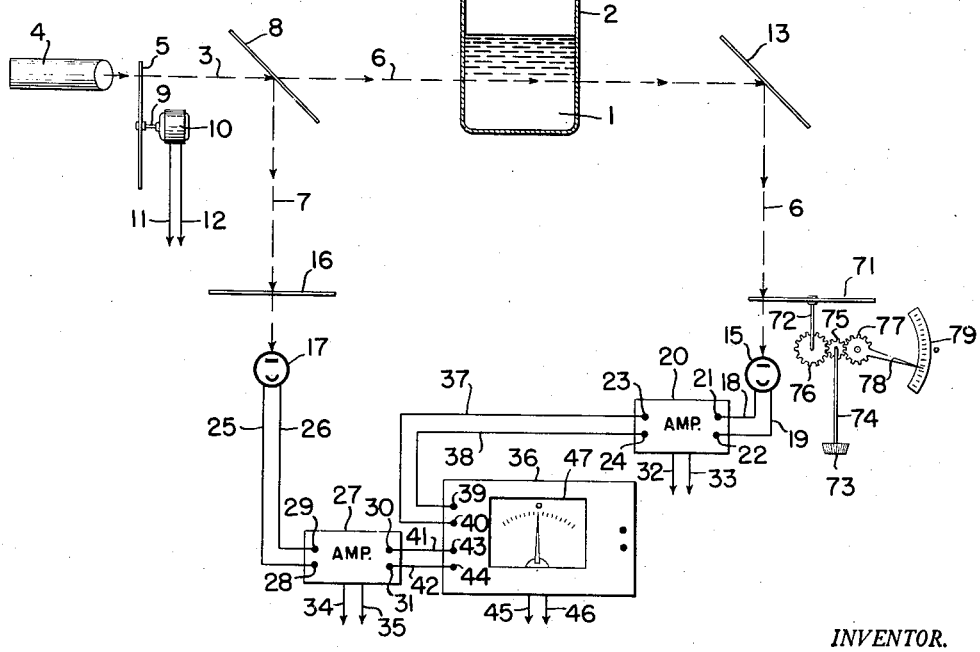
Fig. 5 is a diagrammatic representation of a null-balance form of the apparatus of the present invention which is arranged for manual rebalancing.

The Fig. 5 apparatus

There is illustrated in Fig. 5 an apparatus arrangement according to the present invention which is similar to that of Fig. 1 but which is of the null-balance type as distinguished from the deflectional type of Fig. 1. The Fig. 5 apparatus is arranged to be rebalanced manually, and to provide indications of optical activity in terms of the adjusted position of the manual rebalancing means.

Aside from being of the null-balance type instead of the deflectional type, the Fig. 5 apparatus is practically identical to that of Fig. 1. Specifically, the apparatus of Fig. 5 includes the container 2 for the solution 1 to be analyzed, the light source 4, the rotating disk 5 and its motor 10, the mirrors 8 and 13, the sample photocell 15 and its amplifier 20, the stationary disk 16, the reference photocell 17 and its amplifier 27, and the phase meter 36 with its indicating device 47, all as in the Fig. 1 arrangement. In Figs. 1 and 5, as well as in Fig. 6 to be hereinafter described, like elements are provided with the same reference characters in all of the figures in which they appear.

The stationary polarizing disk 14 of Fig. 1 is replaced in Fig. 5 by an adjustably rotatable polarizing disk 71 which constitutes the rebalancing element in the Fig. 5 apparatus. The phase meter 36 is employed in the Fig. 5 apparatus merely as a null detector, and the disk 71 is adapted to be manually rotated as necessary to maintain a null or zero reading on the indicator 47 and hence to maintain the apparatus in the balanced condition. The optical activity of a sample solution 1, as manifest by the extent and direction or sense of the light rotatory power of the solution, is then indicated by the particular rotational position into which the disk 71 must be rotated in order to maintain the apparatus in the balanced condition in the presence of such a sample solution in the container 2.

The disk 71 is a plane polarizing device as are the disks 5 and 16 and the disk 14 which it replaces, and may be constructed of polarizing film. In fact, the disk 71 may be identical to the disk 5, if desired.

In order to permit its manual rotative adjustment, the rebalancing plane polarizing disk 71 is secured to a rotatable shaft 72 which is adapted to be rotated by a knob 73 through the medium of a knob shaft 74, a knob gear 75 secured thereto, and a gear 76 secured to the disk shaft 72 and in mesh with the gear 75. A pointer gear 77, carrying a pointer 78, is also in mesh with the gear 75, whereby the pointer 78 is caused to move over a co-operating suitably calibrated scale 79 as the knob 73 and disk 71 are rotated. The position of the pointer 78 along the scale 79 at any given time is representative of the rotational position of the disk 71 at that time.

Operation of the Fig. 5 apparatus

The basic operation of the Fig. 5 apparatus is essentially the same as the operation of the Fig. 1 apparatus as hereinbefore described. That is, the continuous rotation of the disk 5 causes the polarization plane of the light beam 3 to rotate continuously around the axis of the beam, whereby the light beam 7 falling on the reference photocell 17, after passing through the disk 16, pulsates in intensity and causes an a. c. output signal to appear in the output of the reference amplifier 27. Also, the intensity of the light beam 6 falling on the sample photocell 15, after passing through the disk 71, pulsates at the same rate as does the beam 7 falling on the photocell 17, the phase of these pulsations relative to those of the reference beam 7 depending in magnitude and sign upon the relationship between two factors. The first of these is the rotation effected by the solution 1 on the polarization plane of the light beam 6, and the second is the rotational position of the rebalancing disk 71.

When the intensity pulsations of the light beams respectively reaching the sample and reference photocells are in phase with each other, there is no phase difference, and hence zero phase angle, between the amplifier output signals as applied to the inputs of the phase meter 36. This is the null or balanced condition of the apparatus, and is manifest by a reading of zero degrees of phase angle on the indicator 47.

When there is no optically active solution in the container 2, and the rotating polarization plane of the light beam 6 hence suffers no additional rotation as it passes through the container 2, the magnitude of the phase angle between the pulsations of the sample light beam 6 reaching the photocell 15 and the pulsations of the reference light beam 7 reaching the photocell 17 depends solely upon the relative positions of the polarizing planes of the disks 16 and 71. Since, however, the disk 16 is arranged to be maintained stationary, the magnitude of the last mentioned phase angle is actually solely dependent upon the rotational position of the disk 71 when no optically active solution 1 is present. Thus, under this condition, the zero point on the scale 79 can be readily established as that point corresponding to the position of the disk 71 which causes the apparatus to assume the balanced condition.

In practice, this calibration of the zero point of the scale 79 is expeditiously effected by manually rotating the disk 71 to the position which causes the indicator 47 to indicate zero phase angle in the absence of any optically active solution in the container 2. In this position of the disk 71, the light beams falling on the two photocells are caused to pulsate in phase with each other. The point on the scale 79 which registers with the pointer 78 under this condition is the zero point of the scale, and corresponds to a zero concentration reference point for all optically active solutions which may be placed in the container 2.

With the disk 71 in the zero position just described, the addition of an optically active solution 1 to the container 2 causes the rotation of the polarization plane of the light beam 6 as previously described. This in turn causes the pulsations in the light falling on the sample photocell 15 to lead or lag, in phase, the pulsations in the light falling on the reference photocell 17, depending upon whether the solution 1 rotates the polarization plane of the beam 6 in the clockwise or in the counter-clockwise direction. Such a phase displacement or difference causes the apparatus to depart from the previously existing balanced condition, and is indicated by movement of the pointer of the indicator 47 respectively to the right or to the left of the zero or null position of that pointer.

It should be apparent that, for the purposes of the apparatus of Fig. 5, the phase meter 36 need indicate only the direction or sense of the phase displacement between the sample and reference signals, and need not provide any indication of the magnitude of such phase displacement. Accordingly, the phase meter 36 of Fig. 5 need only be a phase sense indicating device, and hence need not be as elaborate a device as the phase meter of Fig. 1 wherein phase angle magnitude indications must be provided directly by the phase meter.

In order to return the apparatus to the balanced condition to obtain a measure of the angle through which the solution 1 has rotated the polarization plane of the light beam 6 under the conditions being described, and hence to obtain an indication of the concentration of the solution 1, the knob 73 is manually rotated so as to rotate the rebalancing disk 71 in the proper direction and to the required extent to compensate for the rotation effected by the solution 1. The correct direction to rotate the disk 71 is the direction in which the solution 1 has rotated the polarization plane of the beam 6, and this direction is indicated by the direction of the displacement of the pointer of the indicator 47 from the zero position. The extent of rotation required to compensate for the rotation effected by the solution 1 is that necessary to return the last mentioned pointer to the zero position and hence to rebalance the apparatus.

When this has been accomplished, the pointer 78 will have a new position, relative to the scale 79, which corresponds to the new position of the disk 71, and the angle between this new position of the pointer 78 and the zero position thereof will be equal in magnitude and sense to the angle of polarization plane rotation effected by the solution 1. Accordingly, if the scale 79 is marked off in angular degrees, with the zero degree point coincident with the zero position of the pointer 78, the latter will cooperate with the scale 79 to produce an indication of the number of degrees and the direction through which any optically active substance 1 within the container 2 rotates the polarization plane of the light beam 6 passing through the container. As in the case of the scale of the indicator 47 of the Fig. 1 apparatus, the scale 79 of Fig. 5 may be calibrated in any of numerous ways.

It has been stated above that the proper rotational positioning of the disk 71 is effective to cause the Fig. 5 apparatus to assume the balanced condition following the unbalancing of the apparatus. It has also been explained that the balanced condition is obtained when the disk 71 is positioned so that its polarizing plane is rotated from the zero position thereof through an angle which is equal in magnitude and sense to that through which the polarization plane of the light beam 6 is rotated by virtue of the beam's passage through the solution 1. It should be apparent that, when the disk 71 is so positioned, the continuously rotating polarization plane of the sample light beam 6 coincides with the polarizing plane of the disk 71 each time that the continuously rotating polarization plane of the reference light beam 7 coincides with the polarizing plane of the disk 16. This action causes the photocell output signals to pulsate in phase with each other, and hence causes the apparatus to be in the balanced condition by definition.

In summary, when no optically active solution is present in the container 2, the polarization plane of the beam 6 suffers no rotation by virtue of the beam's passing through the container, and the corresponding position of the disk 71 for balance of the apparatus is the zero position for the disk. When an optically active solution is present in the container 2, the polarization plane of the beam 6 is rotated by such a solution, and the corresponding position of the disk 71 for balance of the apparatus is such that the disk will have been rotated from its zero position in the same direction as that in which the solution rotates the polarization plane of the beam 6, and through an angle which is equal in magnitude to that of said angle of polarization plane rotation.

It is noted that the disk 14 of the Fig. 1 apparatus need not necessarily be the element which is replaced by the rebalancing disk 71 in the Fig. 5 apparatus. Alternately, the disk 14 may be retained in the Fig. 5 arrangement, and the disk 16 replaced by the rebalancing disk 71. No matter which element is employed for rebalancing purposes, the principle of operation of the apparatus as described above remains the same.

*An operating example for the Fig. 5 apparatus*

As an actual operating example for the Fig. 5 apparatus, let it be assumed for purposes of illustration that the same solution as previously described in connection with the Fig. 1 example is placed in the container 2 of the Fig. 5 apparatus. Let it also be assumed that the temperature, wavelength, and solution thickness conditions are the same as for the Fig. 1 example, and that the disk 71 is in the zero position, with the apparatus in the balanced condition, just prior to the addition of the sample solution to be analyzed to the empty container 2.

The addition of said sample solution to the container 2 will cause the apparatus to become unbalanced, as will be indicated by a deflection of the pointer of the indicator 47 from the zero or null position. This deflection will be to the right in Fig. 5, since the sample solution is a sucrose solution and hence has a positive, clockwise rotary power. It is then necessary to rebalance the system in the presence of the sample solution, and this is done by manually rotating the disk 71 by means of the knob 73 until the pointer of the indicator 47 returns to the zero position and thereby indicates that the apparatus is once again in the balanced condition. Assuming that the scale 79 has been previously calibrated in the proper manner, the pointer 78 will now point to the $+16.5°$ point on the scale 79, thereby indicating that the particular sample solution is instantaneously rotating the plane of polarization of the light passing therethrough through an angle of $16.5°$ in the clockwise direction. From this reading, it can readily be calculated that the concentration of the sample solution is 24.9 grams of sucrose per 100 milliliters of solution, this calculation being made in the same manner as that presented hereinbefore in connection with the Fig. 1 example.

It should be noted that the scale 79 may be calibrated, if desired, to indicate directly the concentrations of sucrose solutions under the given conditions. If this is done, the pointer 78 in the present example will register directly with the concentration point on the scale 79 indicative of the foregoing concentration value of 24.9 grams per 100 milliliters.

Figure 6:
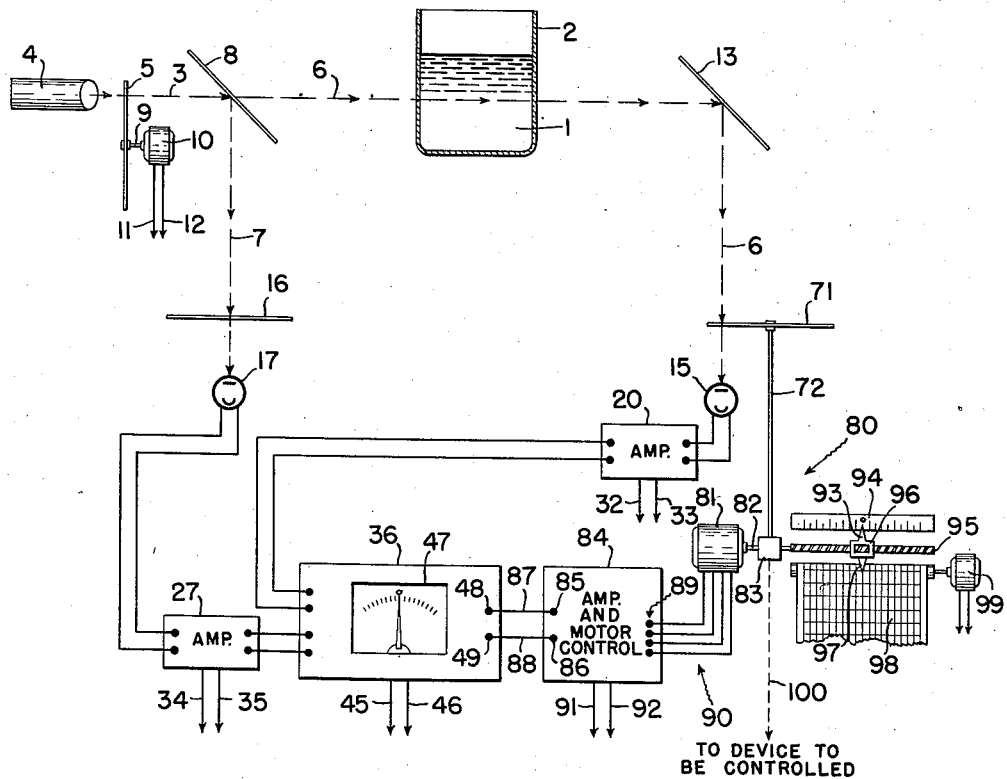
Fig. 6 is a diagrammatic representation of a modification of the Fig. 5 apparatus which is arranged for self-balancing operation.

*The Fig. 6 apparatus*

There is illustrated in Fig. 6 a modification of the Fig. 5 apparatus which is arranged to provide self-balancing operation. To this end, the manual adjusting elements 73 through 79 of the Fig. 5 apparatus are replaced in Fig. 6 by a motor driven rebalancing, indicating, and recording arrangement 80 which is operative, under the control of the D. C. output signal of the phase meter 36, to adjust automatically the rebalancing disk 71 as necessary to maintain the apparatus in the balanced condition, thereby providing an indication and record of the light rotatory power of optically active substances placed in the container 2.

Specifically, the arrangement 80 comprises a reversible, electrical rebalancing motor 81 having a shaft 82 which is coupled through suitable gearing, diagrammatically shown at 83, to the shaft 72 which carries the rebalancing disk 71. Operation of the motor 81 in one direction or the other thereby causes the disk 71 to be rotated in a corresponding direction.

The operation of the motor 81 of the Fig. 6 apparatus is controlled by a device 84, which may be of any of the several types known in the art which are capable of causing the motor 81 to rotate the disk 71 in one or the opposite direction in the presence of a D. C. phase meter output signal of one or the opposite polarity, respectively. A preferred form of such a motor controlling device is the conversion amplifier and motor drive arrangement disclosed in the aforementioned Wills Patent 2,423,540, and, for the purposes of the present explanation, it will be assumed herein that the device 84 is of this type. Accordingly, the device 84 has input terminals 85 and 86 which are connected by respective conductors 87 and 88 to the respective output terminals 48 and 49 of the phase meter 36. The device 84 also has output terminals 89 which are connected by conductors 90 to the input of the motor 81. Conductors 91 and 92 supply the device 84 with energizing current from a suitable source thereof.

The indicating and recording portion of the arrangement 80 comprises a pointer 93 which is adapted to be moved along a cooperating scale 94 by a threaded shaft 95 which engages a carriage 96 on which the pointer 93 is mounted. The shaft 95 is connected by the gearing 83 to the motor shaft 82, whereby the operation of the motor 81 moves the pointer 93 along the scale 94 as the disk 71 is rotated. The carriage 96 also carries a pen 97 which cooperates with a record chart 98 to provide a record of the positions of the pointer 93. A chart driving motor 99 is operative to advance the chart 98 in the conventional manner. A linkage 100 extends from the gearing 83 for providing control functions, where desired, as explained in connection with the Fig. 1 apparatus. The remainder of the Fig. 6 apparatus is identical to that of Fig. 5.

*Operation of the Fig. 6 apparatus*

The operation of the Fig. 6 apparatus is essentially the same as the operation of the Fig. 5 apparatus, except that the disk 71 of Fig. 6 is automatically adjusted by the motor 81 as necessary to maintain the apparatus in the balanced condition, whereas the disk 71 of Fig. 5 must be so adjusted manually. In the Fig. 6 arrangement, the balanced condition exists whenever the photocell output signals pulsate in phase with each other and cause the two input signals applied to the phase meter 36 to have zero phase displacement. Under this condition, the output of the phase meter 36 between the terminals 48 and 49 is zero, and the motor 81 remains at rest. If there is no optically active solution in the container 2, the pointer 93 will be opposite the zero point of the scale 94 at this time.

If an optically active solution 1 is now placed within the container 2, the polarization plane rotation effected thereby will produce a phase difference between the two phase meter input signals, whereby the phase meter will deliver an output signal to the input of the device 84. In the manner described in detail in said Wills patent, the device 84 will then be operative to cause the motor 81 to rotate the disk 71 to a new position at which the phase meter output signal is once more reduced to zero. When this occurs, the motor 81 will be prevented from having further rotation, and the pointer 93 will then occupy a new position along the scale 94 which is representative of the new position of the disk 71, and which is therefore representative of the light rotatory power of the sample solution 1. As in the case of the Fig. 5 apparatus, the scale 94 may be calibrated in terms of the angular rotation effected by the sample solution 1 and/or the concentration of the latter.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. Apparatus for measuring the light rotatory power of an optically active substance, comprising means adapted to produce first and second beams of plane polarized light rotating at a selected rate, first and second plane polarizing devices adapted to intercept said first and second beams, respectively, and adapted to cause said beams to pulsate in intensity at a frequency related to said rate of rotation, means adapted to support an optically active substance to be analyzed in the path of one of said beams before interception by the corresponding one of said devices, thereby to cause the pulsations of said first and second pulsating beams to differ in phase by an amount dependent upon the amount which said substance rotates the plane of polarization of said one of said beams, and phase responsive means adapted to receive said pulsating beams and responsive to said phase difference as a measure of the light rotatory power of said substance.

2. Apparatus for measuring the light rotatory power of an optically active substance, comprising means adapted to produce first and second beams of plane polarized light rotating at a selected rate, first and second plane polarizing devices adapted to intercept said first and second beams, respectively, and adapted to cause said beams to pulsate in intensity at a frequency related to said rate of rotation, means adapted to support an optically active substance to be analyzed in the path of one of said beams before interception by the corresponding one of said devices, first and second light responsive devices respectively responsive to the intensities of said first and second pulsating beams and adapted to produce respective electrical output signals pulsating at said frequency and differing in phase by an amount dependent upon the amount which said substance rotates the plane of polarization of said one of said beams, and phase responsive means connected to said responsive devices and responsive to said phase difference as a measure of the light rotatory power of said substance.

3. Apparatus as specified in claim 2, wherein said phase responsive means is an indicating electrical phase meter having an indicating element which is positioned in accordance with said phase difference between said electrical signals and hence in accordance with the light rotatory power of said substance.

4. Apparatus as specified in claim 2, wherein one of said polarizing devices is rotatable relative to the corresponding one of said beams, and wherein there are included means connected to said one of said polarizing devices and adapted, when actuated, to rotate the latter to vary the magnitude of said phase difference between said electrical signals.

5. Apparatus as specified in claim 2, wherein one of said polarizing devices is rotatable relative to the corresponding one of said beams, and wherein said phase responsive means includes motor means coupled to said one of said polarizing devices and responsive to said phase difference between said electrical signals to rotate the last mentioned device as necessary to maintain said phase difference substantially constant at a predetermined value, whereby the position to which said motor means rotates said last mentioned device is a measure of the light rotatory power of said substance.

6. Apparatus as specified in claim 2, wherein said phase responsive means is provided with a pair of input circuits, and wherein each of said light responsive devices is a photoelectric cell having a light sensitive portion adapted to receive the light of the corresponding one of said beams, and having output terminals connected to a respective one of said input circuits.

7. Apparatus for measuring the light rotatory power of an optically active substance, comprising means adapted to produce first and second beams of plane polarized light rotating at a selected rate, first and second plane polarizing devices adapted to intercept said first and second beams, respectively, and adapted to cause said beams to pulsate in intensity at a frequency related to said rate of rotation, means adapted to support an optically active substance to be analyzed in the path of one of said beams before interception by the corresponding one of said devices, first and second photoelectric devices respectively responsive to said first and second pulsating beams and adapted to produce respective electrical output signals pulsating at said frequency and differing in phase by an amount dependent upon the amount which said substance rotates the plane of polarization of said one of said beams, and in a sense dependent upon the direction of the last mentioned rotation, and phase responsive means connected to said photoelectric devices and responsive to the amount and sense of said phase difference as a measure of the light rotatory power of said substance.

8. Apparatus for measuring the light rotatory power of an optically active substance, comprising a first plane polarizing device, means adapted to pass a beam of light through said device to produce a beam of plane polarized light, drive means coupled to said device and adapted to rotate the latter and hence the plane in which said beam is polarized at a predetermined rate, first and second photoelectric devices, each of which includes a light sensitive portion and output signal terminals, second and third plane polarizing devices normally maintained stationary relative to said first polarizing device, optical means adapted to pass a first portion of said polarized beam through said second polarizing device onto the sensitive portion of one of said photoelectric devices, and adapted to pass a second, different portion of said polarized beam through at least a portion of a substance to be analyzed and thereafter through said third polarizing device onto the sensitive portion of the other of said photoelectric devices, and phase responsive means having input portions electrically connected to said output terminals of said photoelectric devices and responsive to the difference in phase between the output signals of the latter as a measure of the light rotatory power of said substance.

9. Apparatus for measuring the concentration of an optically active solution, comprising a first plane polarizing device, means adapted to pass a beam of light through said device to produce a beam of plane polarized light, drive means coupled to said device and adapted to rotate the latter and hence the plane in which said beam is polarized at a predetermined rate, first and second photoelectric devices, each of which includes a light sensitive portion and output signal terminals, second and third plane polarizing devices, optical means adapted to pass a first portion of said polarized beam through said second polarizing device onto the sensitive portion of one of said photoelectric devices, and adapted to pass a second, different portion of said polarized beam through an optically active solution to be analyzed and thereafter through said third polarizing device onto the sensitive portion of the other of said photoelectric devices, and phase responsive means having input portions electrically connected to said output terminals of said photoelectric devices and responsive to the difference in phase between the output signals of the latter as a measure of the concentration of said solution.

10. Apparatus as specified in claim 8, wherein one of said second and third polarizing devices is rotatable relative to the corresponding one of said light beam portions, and wherein there are included means connected to said one of said polarizing devices and adapted, when actuated, to rotate the latter to vary the magnitude of said phase difference between said output signals.

11. Apparatus as specified in claim 8, wherein one of said second and third polarizing devices is rotatable relative to the corresponding one of said light beam portions, and wherein said phase responsive means includes motor means coupled to said one of said polarizing devices and responsive to said phase difference to rotate the last mentioned device as necessary to maintain said phase difference substantially constant at a predetermined value, whereby the position to which said motor means rotates said last mentioned device is a measure of the light rotatory power of said substance.

12. Apparatus for measuring the light rotatory power of an optically active substance, comprising means adapted to produce first and second beams of light, plane polarizing means adapted to plane polarize said light beams, other plane polarizing means adapted to intercept said light beams subsequent to their polarization by the first mentioned polarizing means, means adapted to rotate one of said polarizing means at a selected rate to cause said light beams to pulsate in intensity at a frequency related to said rate of rotation subsequent to their interception by said other polarizing means, means adapted to support an optically active substance to be analyzed in the path of one of said polarized light beams before interception by said other polarizing means, thereby to cause the pulsations of said one of said light beams to differ in phase from the pulsations of the other of said light beams by an amount dependent upon the amount which said substance rotates the plane of polarization of said one of said light beams, and phase responsive means adapted to receive said pulsating light beams and responsive to said phase difference as a measure of the light rotatory power of said substance.

References Cited in the file of this patent

UNITED STATES PATENTS

| | | |
|---|---|---|
| 2,032,128 | Horsfield | Feb. 25, 1936 |
| 2,167,484 | Berry | July 25, 1939 |
| 2,244,362 | Hartig | June 3, 1941 |
| 2,503,808 | Earl et al. | Apr. 11, 1950 |
| 2,731,875 | Gould | Jan. 24, 1956 |

FOREIGN PATENTS

| | | |
|---|---|---|
| 386,537 | Germany | Dec. 10, 1923 |